United States Patent [19]
Scott

[11] Patent Number: 5,623,527
[45] Date of Patent: Apr. 22, 1997

[54] METHOD AND APPARATUS FOR DETERMINING AN INTEGER POWER OF A FLOATING POINT NUMBER

[75] Inventor: Noel D. Scott, Fort Collins, Colo.

[73] Assignee: Hewlett-Packard Company, Palo Alto, Calif.

[21] Appl. No.: 593,105

[22] Filed: Jan. 30, 1996

[51] Int. Cl.$^6$ .................................................. G11C 19/00
[52] U.S. Cl. .............................................. 377/72; 377/75
[58] Field of Search ................................... 377/75, 72, 70

[56] References Cited

U.S. PATENT DOCUMENTS

5,195,052  3/1993  Karim ........................................ 364/753
5,197,024  3/1993  Pickett ..................................... 364/748.5

*Primary Examiner*—Margaret Rose Wambach

[57] ABSTRACT

Apparatus for determining an integer power of a floating point number includes a shift register, a register file having a partial product register and a binary power register, a multiplier coupled to the register file for performing floating point multiply operations and a state machine for controlling the shift register, the register file and the multiplier. The state machine controls loading of initial values into the shift register and into the partial product register and the binary power register. The state machine controls execution of an integer power routine in which a new partial product value is determined by multiplying the contents of the partial product register by the contents of the binary power register if the LSB of the shift register is a 1. The partial product value is left unchanged if the LSB of the shift register is a 0. A new binary power value is determined by multiplying the contents of the binary power register by itself. Then the contents of the shift register are shifted one bit to the right, and the integer power routine is repeated until all bits in the shift register are 0's.

12 Claims, 8 Drawing Sheets

METHOD AND APPARATUS FOR DETERMINING AN INTEGER POWER OF A FLOATING POINT NUMBER

FIELD OF THE INVENTION

This invention relates to computer graphics systems and, more particularly, to hardware techniques for determining an integer power of a floating point number. The invention is particularly useful in lighting calculations in computer graphics systems, but is not limited to this use.

BACKGROUND OF THE INVENTION

Computer graphics systems are commonly used for displaying graphical representations of objects on a two-dimensional video display screen. Current computer graphics systems provide highly detailed representations and are used in a variety of applications.

In typical computer graphics systems, an object to be represented on the display screen is broken down into graphics primitives. Primitives are basic components of a graphics display and may include points, lines, vectors and polygons, such as triangles and quadrilaterals. Typically, a hardware/software scheme is implemented to render or draw the graphics primitives that represent a view of one or more objects being represented on the display screen.

The primitives of the three-dimensional object to be rendered are defined by a host computer in terms of primitive data. For example, when the primitive is a triangle, the host computer may define the primitive in terms of the X, Y and Z coordinates of its vertices, as well as the red, green and blue (R, G and B) color values of each vertex. Additional primitive data may be used in specific applications. Rendering hardware interpolates the primitive data to compute the display screen pixels that represent each primitive, and the R, G and B color values for each pixel.

The basic components of a computer graphics system may include a geometry engine, or geometry accelerator, a rasterizer and a frame buffer. The system may also include texture mapping hardware. The geometry accelerator receives from the host computer primitive data which defines the primitives that make up the view to be displayed. The geometry accelerator performs transformations on the primitive data, decomposes quadrilaterals into triangles, and performs lighting, clipping and plane equation calculations for each primitive. The output of the geometry accelerator is rendering data used by the rasterizer and the texture mapping hardware to generate final coordinate and color data for each pixel in each primitive. The pixel data from the rasterizer and the pixel data from the texture mapping hardware, if available, are combined and stored in the frame buffer for display on the video display screen.

The operations of the geometry accelerator are highly computation intensive. One frame of a 3-D graphics display may include on the order of hundreds of thousands of primitives. To achieve state of the art performance, the geometry accelerator may be required to perform on the order of several hundred million floating point calculations per second per chip. Furthermore, the volume of data transferred between the host computer and the graphics hardware is very large. The data for a single quadrilateral may be on the order of 64 words of 32 bits each. Additional data transmitted from the host computer to the geometry accelerator includes lighting parameters, clipping parameters and any other parameters needed to generate the graphics display.

Various techniques have been employed to improve the performance of geometry accelerators, including pipelining and multiprocessing. Nonetheless, the need exists for additional improvements in performance.

The red, green and blue color values are determined for each vertex by summing the ambient color and the diffuse and specular color contribution for each of the active light sources in the scene. A scene may have several light sources of different types. For spotlights, the intensity is a function of the angle between two vectors, a vector direction which defines the direction from which the spotlight is pointing and a vector direction from the vertex to the position of the spotlight. The intensity pattern of the spotlight, the variation of intensity as a function of angle, is typically specified by raising the cosine of the angle to an integer power. A larger integer power indicates a narrower pattern. Specular lighting calculations involve raising the cosine of the angle between two vectors to an integer power. Those vectors are the light reflection direction from the vertex and the direction from the vertex to the position of the eye. The integer power defines the degree of specularity. In each case, the cosine of the angle is represented by a floating point number. Typically, multiple processor cycles are required to determine an integer power of a floating point number. Since, as noted above, one frame of a 3-D graphics display may include on the order of hundreds of thousands of primitives, it is important to perform this calculation as efficiently and quickly as possible.

In prior art graphics systems, the lighting calculations which required determining an integer power of a floating point number were performed in software in the host computer. This approach was relatively inefficient and occupied resources of the host computer which could not therefore be utilized for other tasks.

SUMMARY OF THE INVENTION

According to a first aspect of the invention, apparatus for determining an integer power of a floating point number is provided. The apparatus comprises a shift register having an LSB, a register file having a partial product register and a binary power register, a multiplier coupled to the register file for performing floating point multiply operations, and a state machine for controlling the shift register, the register file and the multiplier. The state machine comprises means for loading an integer power value into the shift register and for loading a floating point input value into the binary power register, and means for loading the floating point input value into the partial product register if the LSB of the shift register is active and for loading a value of 1 into the partial product register if the LSB of the shift register, is inactive. The state machine further comprises means for shifting the contents of the shift register one bit to the right following loading of the binary power register and the partial product register, and means for executing an integer power routine. The integer power routine includes determining a new binary power value by causing the multiplier to multiply the contents of the binary power register by itself, determining a new partial product value by causing the multiplier to multiply the contents of the partial product register by the contents of the binary power register if the current LSB of the shift register is active, determining a new partial product value equal to the contents of the partial product register if the current LSB of the shift register is inactive, and shifting the contents of the shift register one bit to the right to provide a new LSB following the determination of a new binary power value and a new partial product value. The state machine further comprises means for repeating the integer power routine up to N-1 times, where N is the number of bits in the integer power value. The contents of the partial product register represent the integer power of the floating point input value after the integer power routine is executed N-1 times.

In a preferred embodiment, the state machine further includes means for testing all bits in the shift register following each execution of the integer power routine and means responsive to a determination that all bits in the shift register are inactive, for inhibiting further execution of the integer power routine. This feature reduces the calculation time for small integer power values.

In one embodiment, the floating point input value represents the cosine of an angle between a direction vector that defines the direction from which a spotlight is pointing and a direction vector from a vertex of a graphics primitive to the position of the spotlight in a computer graphics system. In another embodiment, the floating point input value represents the cosine of an angle between a vector that defines the reflected light ray from a vertex of a graphics primitive and a vector that defines the direction from the vertex of the graphics primitive to the position of the eye in a computer graphics system.

The apparatus may further comprise a plurality of integer power value registers. The means for loading the integer power value may comprise means for addressing one of the integer power value registers.

According to another aspect of the invention, a method for determining an integer power of a floating point number is provided. The method comprises the steps of (a) providing a shift register having an LSB, a register file having a partial product register and a binary power register, and a multiplier coupled to thee register file for performing floating point multiply operations, (b) loading an integer power value into the shift register, (c) loading a floating point input value into the binary power register, (d) loading the floating point input value into the partial product register if the LSB of the shift register is active, (e) loading an initial value of 1 into the partial product register if the LSB of the shift register is inactive, (f) shifting the contents of the shift register one bit to the right following the steps of loading the binary power register and the partial product register, (g) determining a new binary power value by multiplying the contents of the binary power register by itself, (h) determining a new partial product value by multiplying the contents of the partial product register by the contents of the binary power register if the LSB of the shift register is active, (i) determining a new partial product value equal to the contents of the partial product register if the LSB of the shift register is inactive, (j) shifting the contents of the shift register one bit to the right following steps (h) and (i), and (k) repeating steps (g) through (j) up to N-1 times, where N is the number of bits in the integer power value. The contents of the partial product register represent the integer power of the floating point input value after steps (g) through (j) are executed N-1 times.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
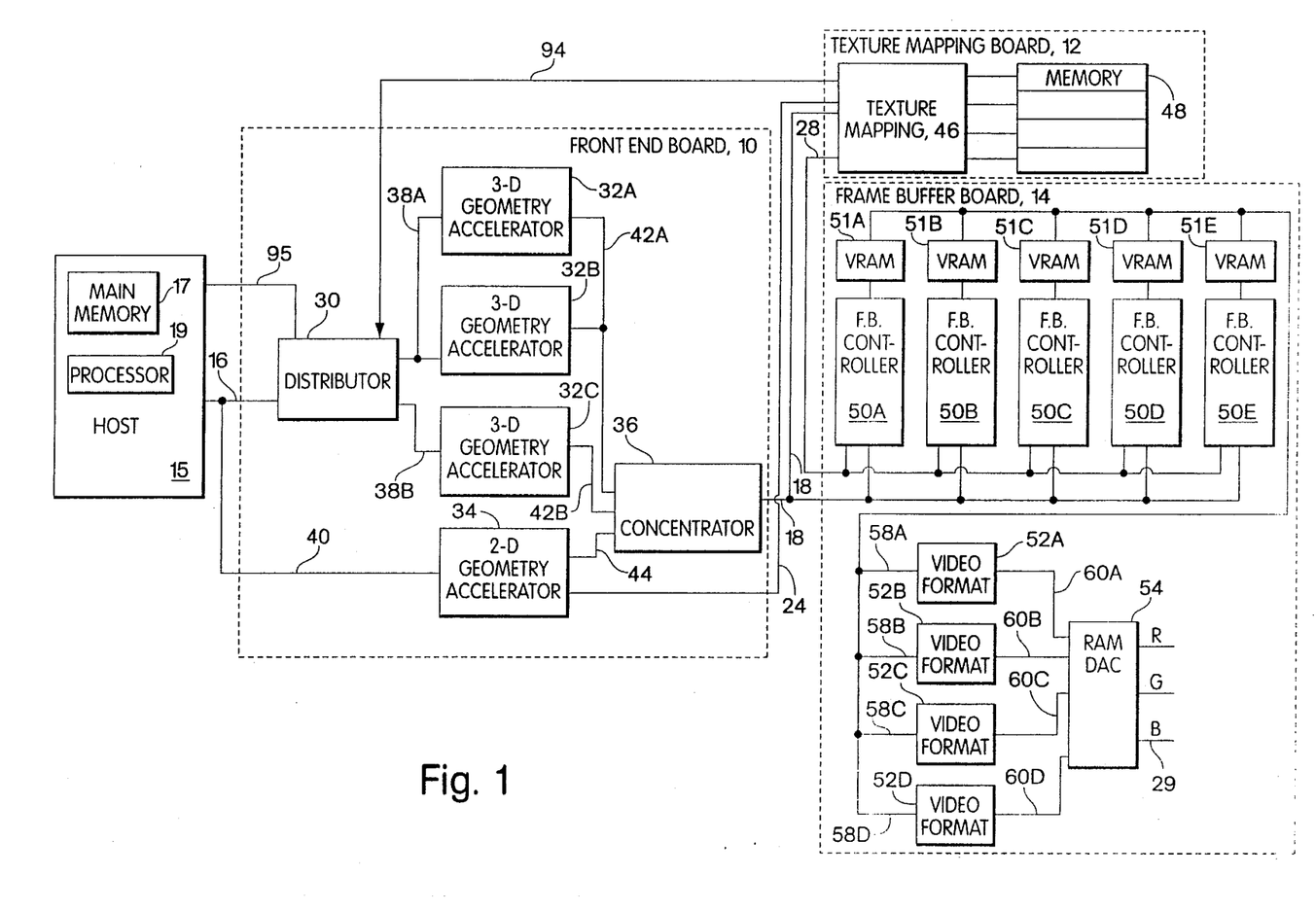
FIG. 1 is a block diagram of a first embodiment of a computer graphics system incorporating the present invention.

FIG. 1 is a block diagram of a first embodiment of a computer graphics system suitable for incorporation of the present invention. It should be understood that the illustrative implementation shown is merely exemplary with respect to the number of boards and chips, the manner in which they are partitioned, the bus widths, and the data transfer rates. Numerous other implementations can be employed. As shown, the system includes a front end board 10, a texture mapping board 12, and a frame buffer board 14. The front end board communicates with a host computer 15 over a 52-bit bus 16. The front end board receives primitives to be rendered from the host computer over bus 16. The primitives are specified by X,Y,Z coordinate data, R; G and B color data, alpha, normals and texture S,T coordinates for portions of the primitives, such as for the vertices when the primitive is a triangle.

Data representing the primitives in three dimensions then is provided by the front end board 10 to the texture mapping board 12 and the frame buffer board 14 over 64-bit bus 18. The texture mapping board interpolates the primitive data received to compute the screen display pixels that will represent the primitive, and determines corresponding resultant texture data for each primitive pixel. The resultant texture data is provided to the frame buffer board over five 11-bit buses 28, which are shown in FIG. 1 as a single bus for clarity of illustration.

The frame buffer board 14 also interpolates the primitive data received from the front end board 10 to compute the pixels on the display screen that will represent each primitive, and to determine object color values for each pixel. The frame buffer board then combines, on a pixel by pixel basis, the object color values with the resultant texture data provided from the texture mapping board, to generate resulting image R,G,B values for each pixel. R,G,B color control signals for each pixel are respectively provided over R,G,B lines 29 to control the pixels of the display screen (not shown) to display a resulting image on the display screen that represents the texture mapped primitive.

The front end board 10, texture mapping board 12 and frame buffer board 14 each is preferably pipelined and operates on multiple primitives simultaneously. While the texture mapping and frame buffer boards operate on primitives previously provided by the front end board, the front end board continues to operate upon and provide new primitives until the pipelines in the boards 12 and 14 become full.

The front end board 10 may include a distributor chip 30, 3 three-dimensional (3-D) geometry accelerator chips 32A, 32B and 32C, a two-dimensional (2-D) geometry accelerator chip 34 and a concentrator chip 36. The distributor chip 30 receives the X,Y,Z coordinate and color primitive data over bus 16 from the host computer, and distributes 3-D primitive data evenly among the 3-D geometry accelerator chips 32A, 32B and 32C. In this manner, the system bandwidth is increased because three groups of primitives are operated upon simultaneously. Data is provided over 40-bit bus 38A to the 3-D geometry accelerator chips 32A and 32B, and over 40-bit bus 38B to chip 32C. Both buses 38A and 38B transfer data at a rate of 60 MHZ and provide sufficient bandwidth to support two 3-D geometry accelerator chips. 2-D primitive data is provided over a 44-bit bus 40 to the 2-D geometry accelerator chip 34 at a rate of 40 MHZ.

Each 3-D geometry accelerator chip transforms the X,Y,Z coordinates that define the primitives received into corresponding screen space coordinates, determines object R,G,B values and texture S,T values for the screen space coordinates, decomposes quadrilaterals into triangles, calculates partial slope information, performs lighting calculations and computes a triangle plane equation to define each triangle. Each 3-D geometry accelerator chip also performs view clipping operations to ensure an accurate screen display of the resulting image when multiple windows within the screen are displayed, or when a portion of a primitive extends beyond the view volume represented on the display screen. Relevant operations performed by each 3-D geometry accelerator chip are described in more detail below. Output data from the 3-D geometry accelerator chips 32A, 32B and 32C respectively is provided over 44-bit buses 42A and 42B to concentrator chip 36 at a rate of 60 MHZ. Two-dimensional geometry accelerator chip 34 also provides output data to concentrator chip 36 over a 46-bit bus 44 at a rate of 45 MHZ. Concentrator chip 36 combines the 3-D primitive output data received from the 3-D geometry accelerator chips 32A–C, re-orders the primitives to the original order they had prior to distribution by the distributor chip 30, and provides the combined primitive output data over bus 18 to the texture mapping and frame buffer boards.

Texture mapping board 12 includes a texture mapping chip 46 and a local memory 48 which is preferably arranged as a cache memory. In a preferred embodiment of the invention, the cache memory is formed from a plurality of SDRAM (synchronous dynamic random access memory) chips. The cache memory 48 stores texture MIP map data associated with the primitives being rendered in the frame buffer board. The texture MIP map data is downloaded from a main memory 17 of the host computer 15, over bus 40, through the 2-D geometry accelerator chip 34, and over 24-bit bus 24.

The texture mapping chip 46 successively receives primitive data over bus 18 representing the primitives to be rendered on the display screen. As discussed above, the primitives provided from the 3-D geometry accelerator chips 32A–C include lines and triangles. The texture mapping board does not perform texture mapping of points or lines, and operates only upon triangle primitives. The data representing the triangle primitives includes the X,Y,Z object pixel coordinates for at least one vertex, the object color R,G,B values of the at least one vertex, the coordinates in S,T of the portions of the texture map that correspond to the at least one vertex, and the plane equation of the triangle. The texture mapping chip 46 ignores the object pixel z coordinate and the object color R,G,B values. The chip 46 interpolates the X,Y pixel coordinates to calculate S and T coordinates that correspond to each X,Y screen display pixel that represents the primitive. For each pixel, the texture mapping chip accesses the portion of the texture MIP map that corresponds thereto from the cache memory, and computes resultant texture data for the pixel, which may include a weighted average of multiple texels.

The resultant texture data for each pixel is provided by the texture mapping chip 46 to the frame buffer board over five buses 28. The five buses 28 are respectively coupled to five frame buffer controller chips 50A, 50B, 50C, 50D and 50E provided on the frame buffer board, and provide resultant texture data to the frame buffer controller chips in parallel. The frame buffer controller chips 50A, 50B, 50C, 50D and 50E are respectively coupled to groups of associated VRAM (video random access memory) chips 51A–E. The frame buffer board may further include four video format chips, 52A, 52B, 52C and 52D, and a RAMDAC (random access memory digital-to-analog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R,G,B color values for each pixel coordinate. For those primitives (i.e., triangles) for which resultant texture data is provided from the texture mapping board, the frame buffer controller chips combine, on a pixel by pixel basis, the object color values and the resultant texture data to generate final R,G,B values for each pixel to be displayed on the display screen. A blending mode defining the manner in which the object and texture color values are combined is controlled by a rendering mode control word that is provided over bus 28.

The resulting image video data generated by the frame buffer controller chips 50A–E, including R,G,B values for each pixel, is stored in the corresponding VRAM chips 51A–E. Each group of VRAM chips 51A–E includes eight VRAM chips, such that forty VRAM chips are located on the frame buffer board. Each of video format chips 52A–D is connected to, and receives data from, a different set of ten VRAM chips. The video data is serially shifted out of the VRAM chips and is respectively provided over 64-bit buses 58A, 58B, 58C, and 58D to the four video format chips 52A, 52B, 52C and 52D at a rate of 27 MHZ. The video format chips format the video data so that it can be handled by the RAMDAC and provide the formatted data over 32-bit buses 60A, 60B, 60C and 60D to RAMDAC 54 at a rate of 33 MHZ. RAMDAC 54, in turn, converts the digital color data to analog R,G,B color control signals and provides the R,G,B control signals for each pixel to a screen display (not shown) along R,G,B control lines 29.

Figure 2:
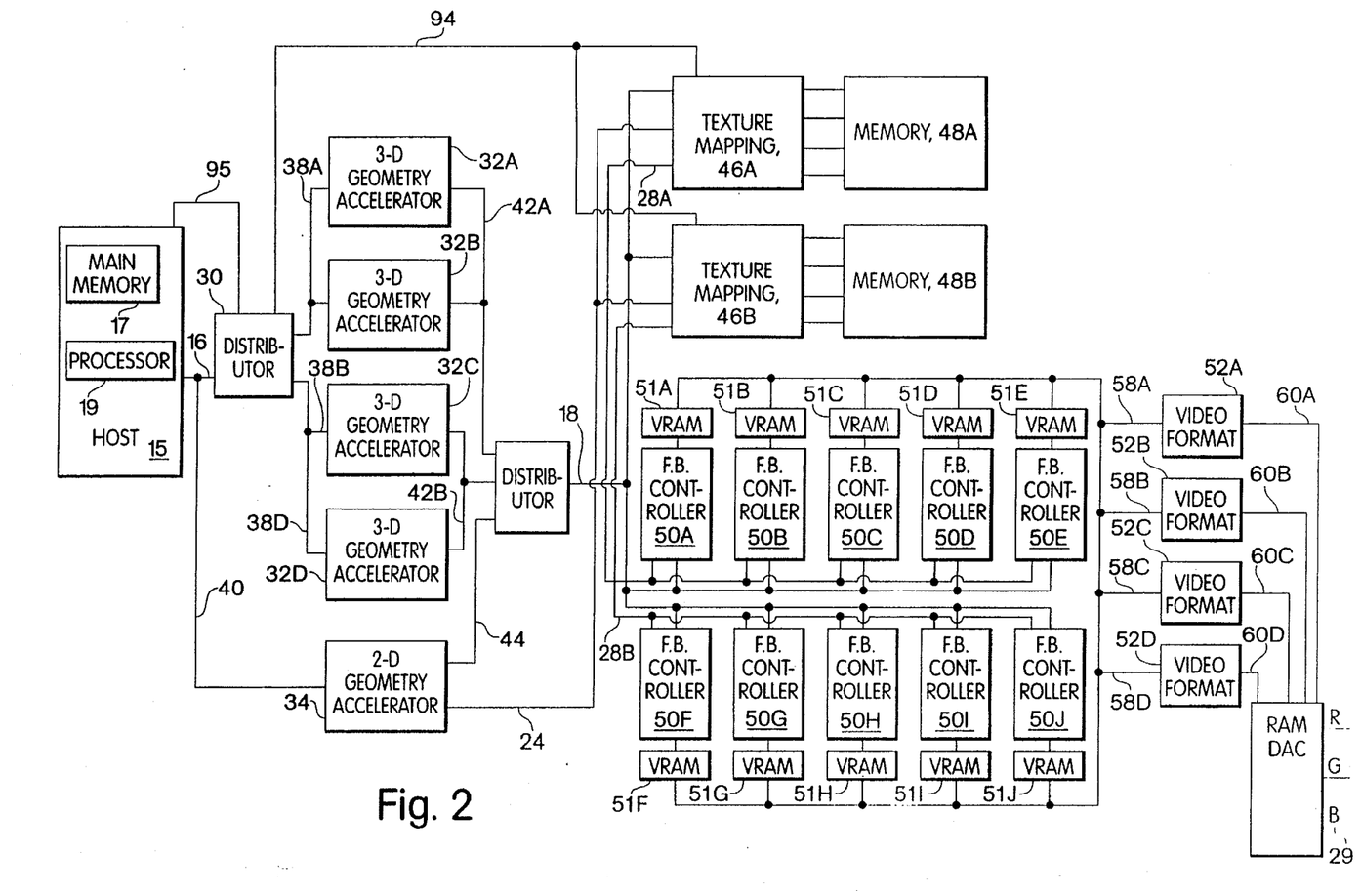
FIG. 2 is a block diagram of a second embodiment of a computer graphics system incorporating the present invention.

In one embodiment, hardware ion the texture mapping board 12 and the frame buffer board 14 is replicated so that certain primitive rendering tasks can be performed on multiple primitives in parallel, thereby increasing the bandwidth of the system. An example of such an alternate embodiment of the present invention is shown in FIG. 2, which is a block diagram of a computer graphics system of the present invention having certain hardware replicated. The system of FIG. 2 includes four 3-D geometry accelerator chips 32A, 32B, 32C and 32D, two texture mapping chips 46A and 46B respectively associated with cache memories 48A and 48B, and ten frame buffer chips 50A–50J, each with an associated group of VRAM chips. The operation of the system of FIG. 2 is similar to that of the system of FIG. 1, described above.

The replication of the hardware in the embodiment of FIG. 2 allows for increased system bandwidth because certain primitive rendering operations can be performed in parallel on multiple primitives.

Figure 3:
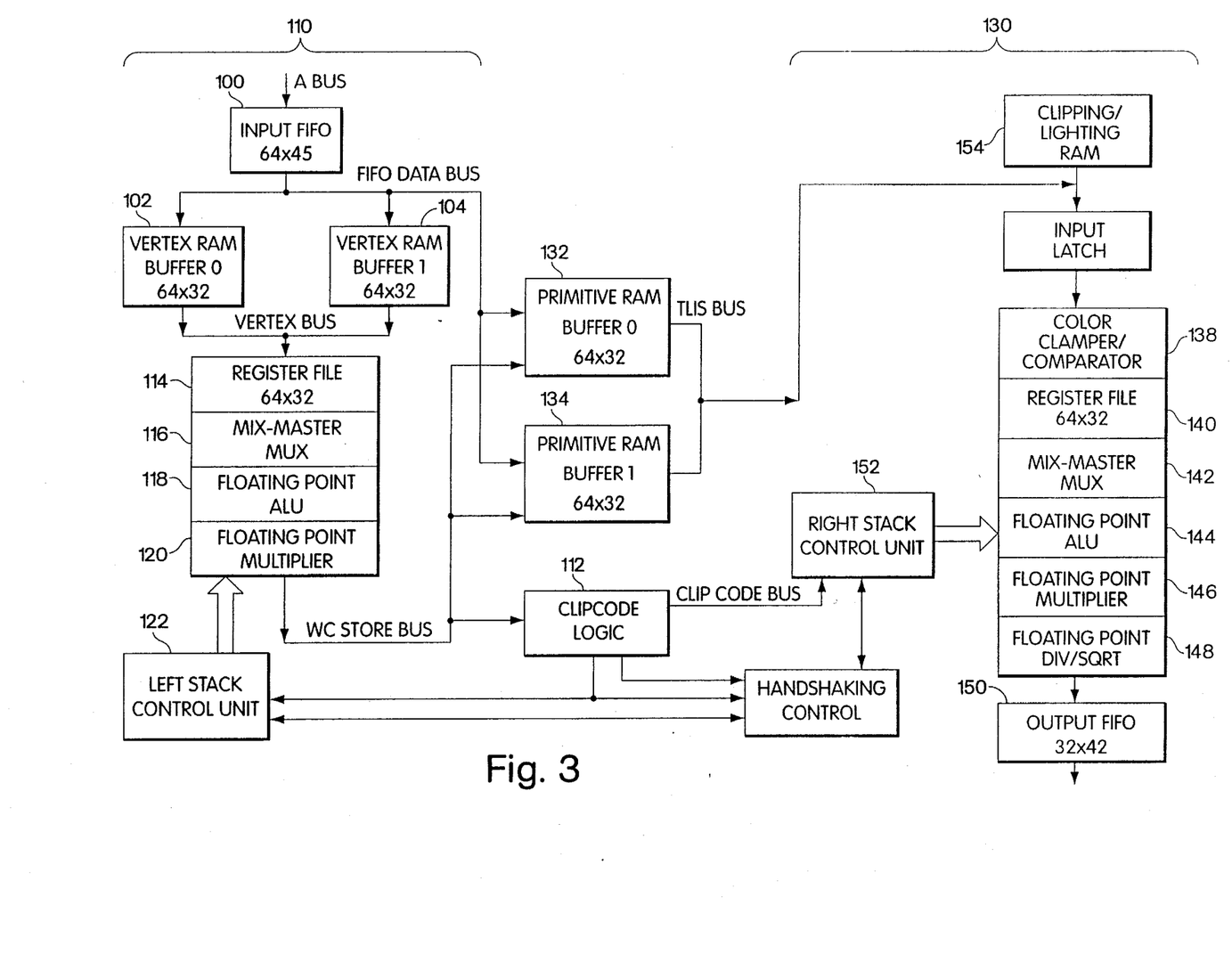
FIG. 3 is a block diagram of a geometry accelerator incorporating the present invention.

A simplified block diagram representative of geometry accelerator chips 32A, 32B and 32C is shown in FIG. 3. Primitive data from host computer 15 is supplied through an input FIFO 100 to a double-buffered vertex RAM which includes vertex RAM (buffer 0) 102 and vertex RAM (buffer 1) 104. The geometry accelerator includes two separate processors in a pipeline configuration. A left stack 110 includes clip code logic 112, a register file 114, a multiplexer 116, a floating point ALU 118 and a floating point multiplier 120. Operations of the left stack 110 are controlled by a left stack control unit 122, which includes address decode logic, a transformation engine and a decomposition engine. Results from the left stack 110 are supplied to a right stack 130 through a double-buffered primitive RAM, including a primitive RAM (buffer 0) 132 and a primitive RAM (buffer 1) 134. The right stack includes a color clamper/comparator 138, a register file 140, a multiplexer 142, a floating point ALU 144, a floating point multiplier 146, and a floating point divide/square root unit 148. Results from the right stack 130 are supplied through an output FIFO 150 to the texture mapping board 12 and to the frame buffer board 14 (FIG. 1). Operations of the right stack 130 are controlled by a right stack control unit 152, which includes lighting, clipping and plane equation engines. Clipping and lighting parameters are supplied by the host computer 15 to a clipping/lighting RAM 154. A handshaking control unit 156 is coupled between the left stack control unit 122, the right stack control unit 152 and the clip code logic 112. The handshaking control unit 156 controls communication between the left stack 110 and the right stack 130, and facilitates the two stacks working together.

The geometry accelerator performs transformations, decomposition of quadrilaterals, partial slope calculations for triangles and vectors, lighting (or shading), clipping, and plane equation (or slope) calculations of randomly oriented and defined quadrilaterals (quads), triangles and vectors. The outputs are supplied to the scan converters in the frame buffer board 14 for rendering into pixel data and to texture mapping board 12 for generation of per pixel texture color values.

In the example of FIG. 3, only the right stack 130 contains a divider, in order to limit size and cost. Because the right stack contains a divider and the left stack does not, the partitioning of functionality of the geometry accelerator is for the left stack to perform transformations, partial slope calculations, clip checking, decomposition and some pre-calculations for lighting. The right stack performs lighting, clipping and plane equation calculations. The basic flow of operations is for primitive data to be entered in the input FIFO 100 from the host computer. The primitive data is put into one of the vertex RAM buffers 102 and 104. The left stack 110 then performs transformations, decomposition, and partial slope calculations and places the results in one of the primitive RAM buffers 132 and 134. When the left stack has completed its operations for a primitive, it notifies the right stack 130 to begin operations on the primitive. The left stack can then start working on the next primitive. At the same time, the right stack performs lighting, clipping (if required), and plane equation calculations on the primitive that is in the primitive RAM buffer.

In an alternative embodiment, both the left and right stacks contain identical hardware, including dividers. In this configuration, functionality may be partitioned such that each stack performs the same operations on different primitives.

As indicated above, the right stack of the geometry accelerator performs lighting calculations for each primitive on a per vertex basis. In a preferred embodiment, up to eight light sources can be provided. The parameters of each light source are stored in the clipping/lighting RAM 154, except for the spotlight powers and the specular power, which are stored in the registers 210 and 212 (FIG. 4) of the right stack control unit 152. The material reflectance properties are stored in RAM 154. The light source parameters include X, Y and Z values of light position, X, Y and Z values of light direction and red, green and blue light colors and light attenuation coefficients. The material reflectance parameters include red, green and blue specular reflectance values and red, green and blue diffuse reflectance values. The color of each vertex is equal to the sum of the ambient color, and diffuse and specular color contributions for each of the active light sources in the scene, in accordance with the following equation:

$$\text{Vertex Color} = C_a + \sum_{i=1}^{m} C_{di} + \sum_{i=1}^{m} C_{si}$$

where $C_a$=ambient color contribution, $C_{di}$=diffuse color contribution of light source I, $C_{si}$=specular color contribution of light source I and m=number of light sources. Calculation of the specular and diffuse color contributions of a spotlight involves raising the cosine of the angle between two directions to an integer power. Those directions are the vector from the vertex position to the Spotlight position and the vector that defines the direction from which the spotlight is pointing. The contribution of specular reflection by the light source is calculated as a function of the cosine of the angle between the vector that defines the reflected light ray and the vector that defines the direction from the vertex position to the eye position. In each case, a calculation of the form $(\cos \alpha)^{Integer\ Power}$ is required, where $\cos \alpha$ is a floating point number.

Figure 4:
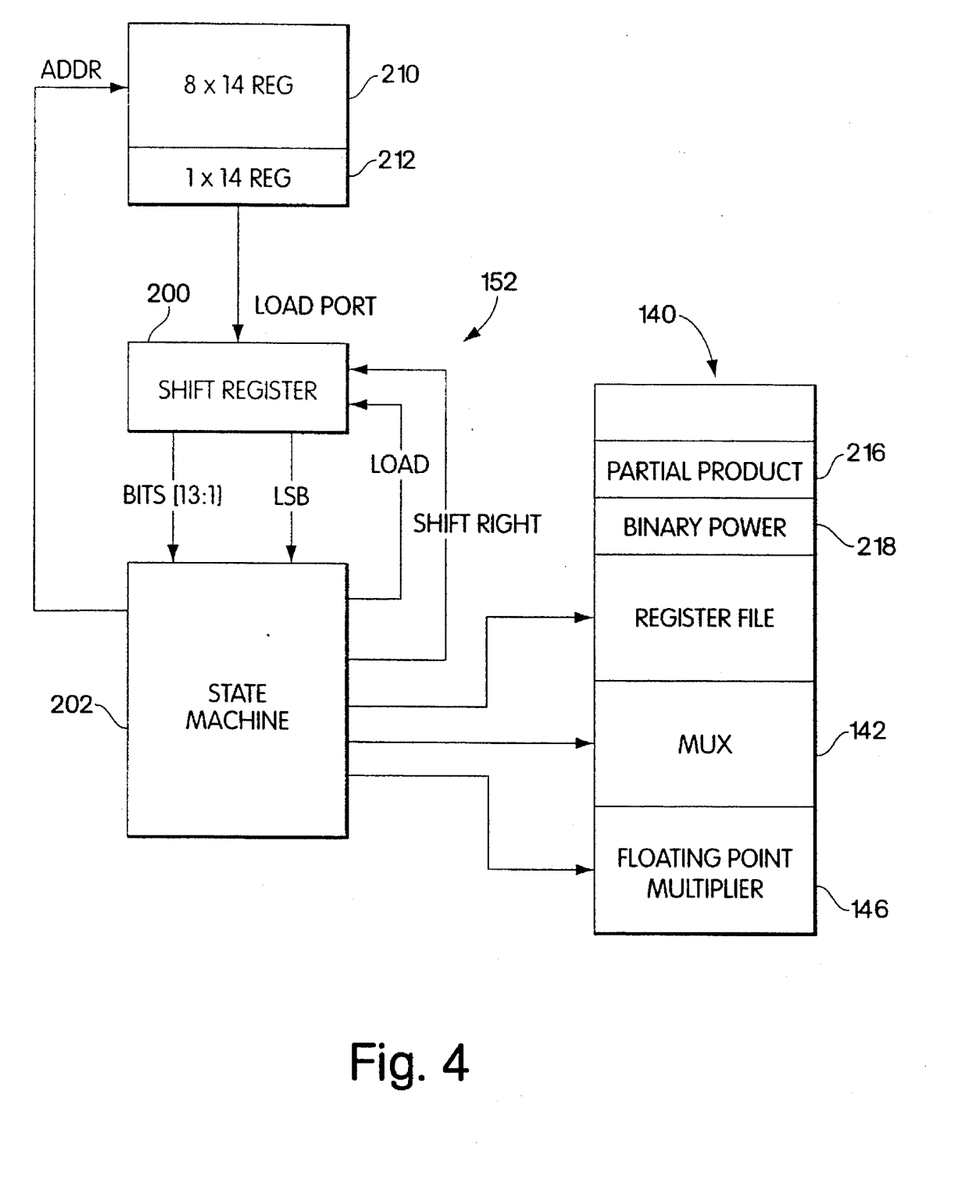
FIG. 4 is a block diagram of the hardware elements of the geometry accelerator involved in determining an integer power of a floating point number in accordance with the present invention.

The present invention involves a hardware implementation for efficiently determining an integer power of a floating point number in connection with the lighting calculations described above. The portions of the right stack of the geometry accelerator of FIG. 3 which are utilized in raising a floating point number to an integer power are illustrated in FIG. 4. The right stack control unit 152 includes a shift register 200 and a state machine 202. The right stack control unit 152 also includes spotlight power registers 210 for holding a spotlight power value for each spotlight and a specular power register 212 for holding a specular power value. In a preferred embodiment, up to eight spotlights may be defined, and one specular power value applies to all light sources. In the preferred embodiment, each light power value bas 14 bits. Thus, the right stack control unit 152 includes eight registers 210 of 14 bits each for spotlight power values and one register 214 of 14 bits for the specular power value. It will be understood that different numbers of spotlight power and specular power registers may be utilized and that each power value may be specified by any suitable number of bits.

The shift register 200 has a parallel load port connected to registers 210 and 212. The contents of shift register 200, including the least significant bit (LSB) and bits [1:13] are supplied to state machine 202. The state machine 202 supplies Load and Shift Right control signals to shift register 200. One of the registers 210 and 212 is addressed by the state machine 202. The power value in the addressed register is supplied to the shift register 200. The state machine 200 tests the bits in the shift register 200 and controls shifting of the power value to the right as described below.

The register file 140 includes a partial product register 216 and a binary power register 218. The state machine 202 controls transfer of values from the partial product register 216 and the binary power register 218 to and from the floating point multiplier 146 via multiplexer 142 as described below.

Figure 7:
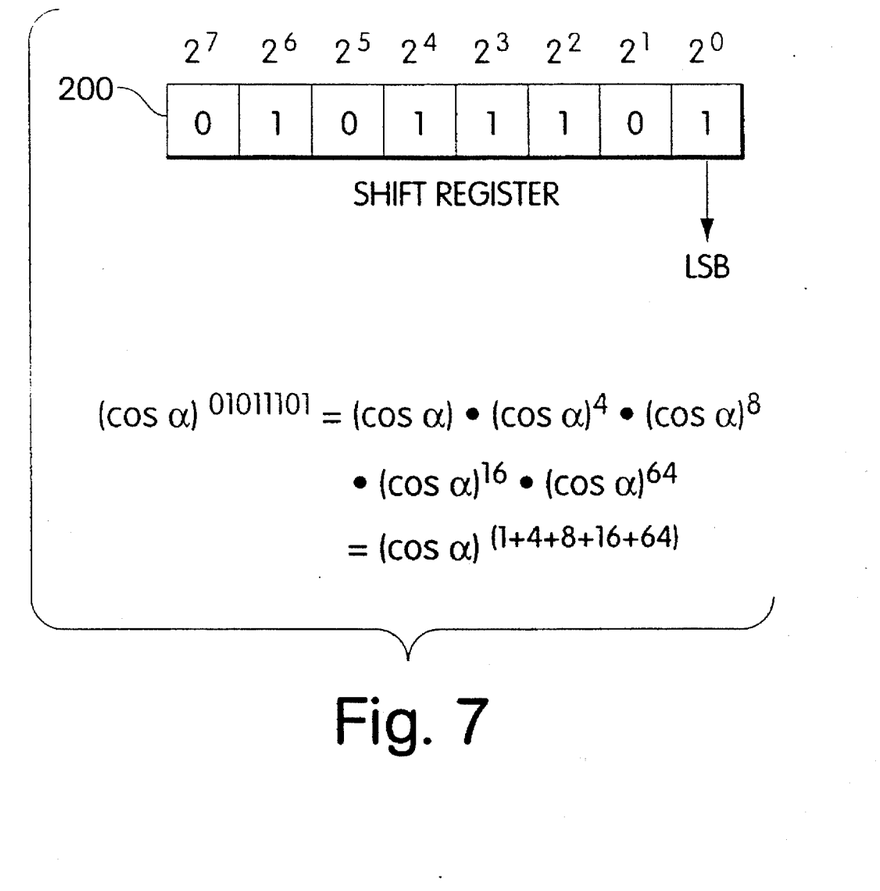
FIG. 7 illustrates the technique for determining an integer power of a floating point number.

The technique utilized for determining an integer power of a floating point number is illustrated in FIG. 7. An integer power value P in binary format is placed in shift register 200. Each bit of the integer power value represents a binary weight as indicated above each bit of shift register 200. For each bit of the binary power value that is equal to 1 (the active state), the floating point number is raised to the corresponding binary weight. The integer power of the floating point number is the product of the floating point number raised to the corresponding binary weight for each bit in the binary power value that is equal to 1. In the example given, the binary power value P is 01011101. For each bit that is a 1 in the binary power value, floating point number is raised to the corresponding binary weight. Bits in the binary power value that are equal to 0 (the inactive state) do not contribute to the integer power of the floating point number. The result is shown in FIG. 7.

Operation of the hardware implementation shown in FIG. 4 is described with reference to the flow diagram of FIGS. 5 and 6. One of the power registers 210 and 211 is addressed by the state machine 202 in step 300, and the power value in the addressed register is loaded into shift register 200 in step 302. The addressed power register corresponds to the spotlight being calculated, or its the specular power register 212 for specular power calculations. In step 304, a floating point input value is loaded by the state machine 202 into the binary power register 218. The floating point input value corresponds to the cosine of an angle in spotlight or specular power calculations, as described above. In step 306, the state machine 202 tests the LSB of shift register 200. When the LSB of shift register 200 is a 1 (active), the floating point input value is loaded by the state machine 202 into the partial product register 216 in step 308. When the LSB of shift register 200 is a 0 (inactive), the state machine 202 loads a value of 1 into the partial product register 216 in step 310. Next, the contents of the shift register 200 are shifted one bit to the right, or more specifically one bit toward the LSB, in step 312.

Figure 6:
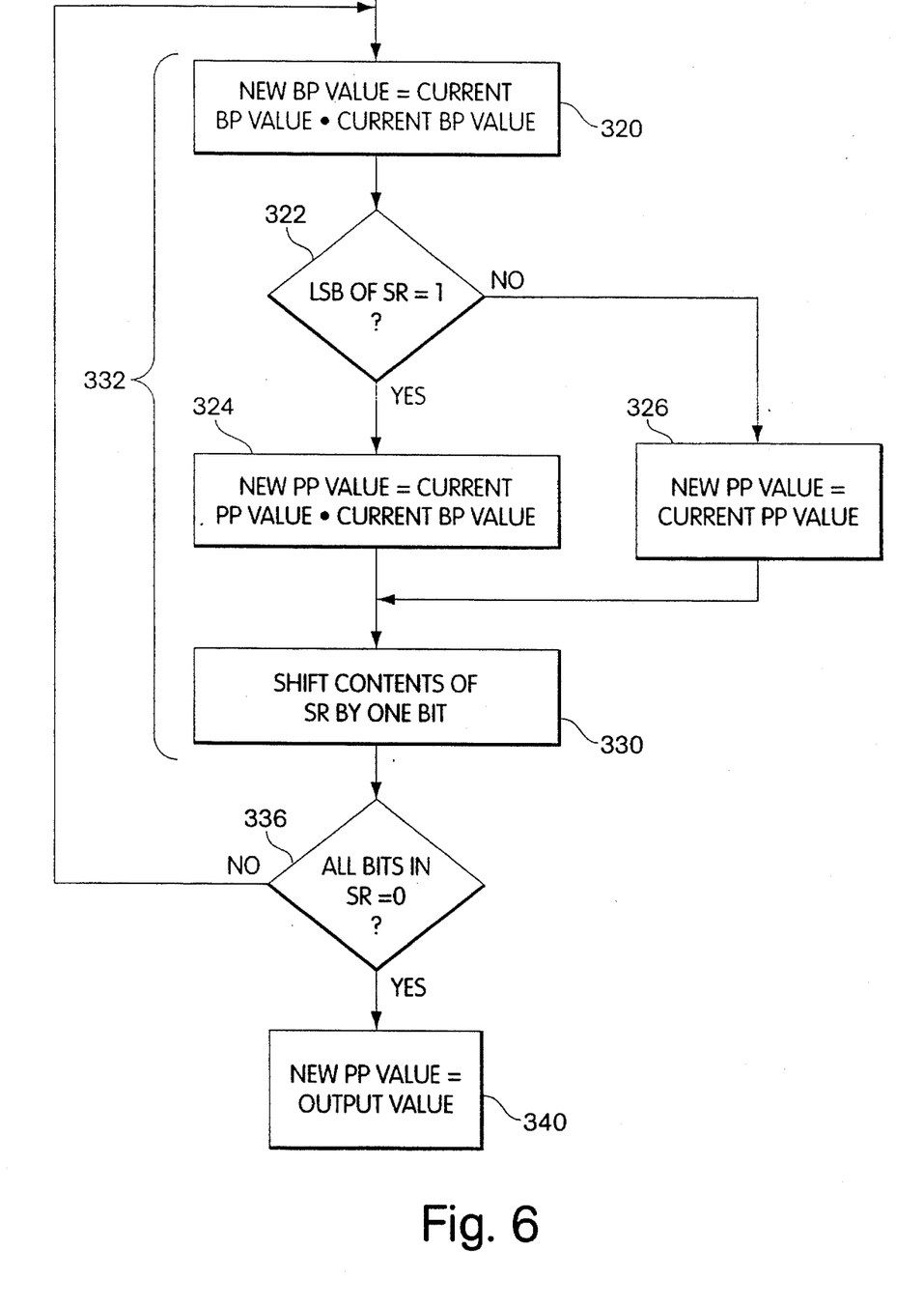

Referring now to FIG. 6, a new binary power value is determined in step 320 by multiplying the current binary power value by itself (squaring the current binary power value). More particularly, the state machine 202 causes the contents of binary power register 218 to be transferred to the floating point multiplier 146 and instructs the floating point multiplier 146 to perform the multiplication. The result is returned to the binary power register 218 as the new binary power value. In step 322, the state machine 202 tests the LSB of shift register 200. Since the contents of the shift register 200 were shifted to the right by one bit in step 312, bit [1] of the power value is tested in step 322. If the LSB of shift register 200 is a 1, a new partial product value is calculated in step 324. The new partial product value is determined in step 324 by multiplying the current partial product value by the current binary power value. More particularly, the state machine 202 causes the contents of partial product register 216 and binary power register 218 to be transferred to the floating point multiplier 146 and instructs the floating multiplier 146 to multiply these values. The result is returned to the partial product register 216 as the new partial product value. When the LSB of shift register 200 is a 0, a new partial product value is determined in step 326. The new partial product value determined in step 326 is the same as the current partial product value. Thus, the contents of partial product register 216 are left unchanged. In step 330, the contents of shift register 200 are shifted one bit to the right (one bit toward the LSB). This causes the next bit of the power value to appear in the LSB location of the shift register 200.

Steps 320, 322, 324, 326 and 330 constitute an integer power routine 332 that may be repeated for each bit of the binary integer power value except the zero order bit. More particularly, when the power value has N bits, the integer power routine 332 is repeated up to N-1 times. The calculation time can be reduced when one or more of the high order bits of the integer power value are zero. For each bit in the binary integer power value that is 0, the partial product value remains unchanged in step 326. Thus, the calculation can be terminated when all high order bits remaining in shift register 200 are zero. In step 336, the bits in the shift register are tested. When the remaining bits are not all zero, the state machine 202 causes the integer power routine 332 to be repeated. When all bits in the shift register are zero, the new partial product value in partial product register 216 is defined as the output value in step 340.

Figure 5:
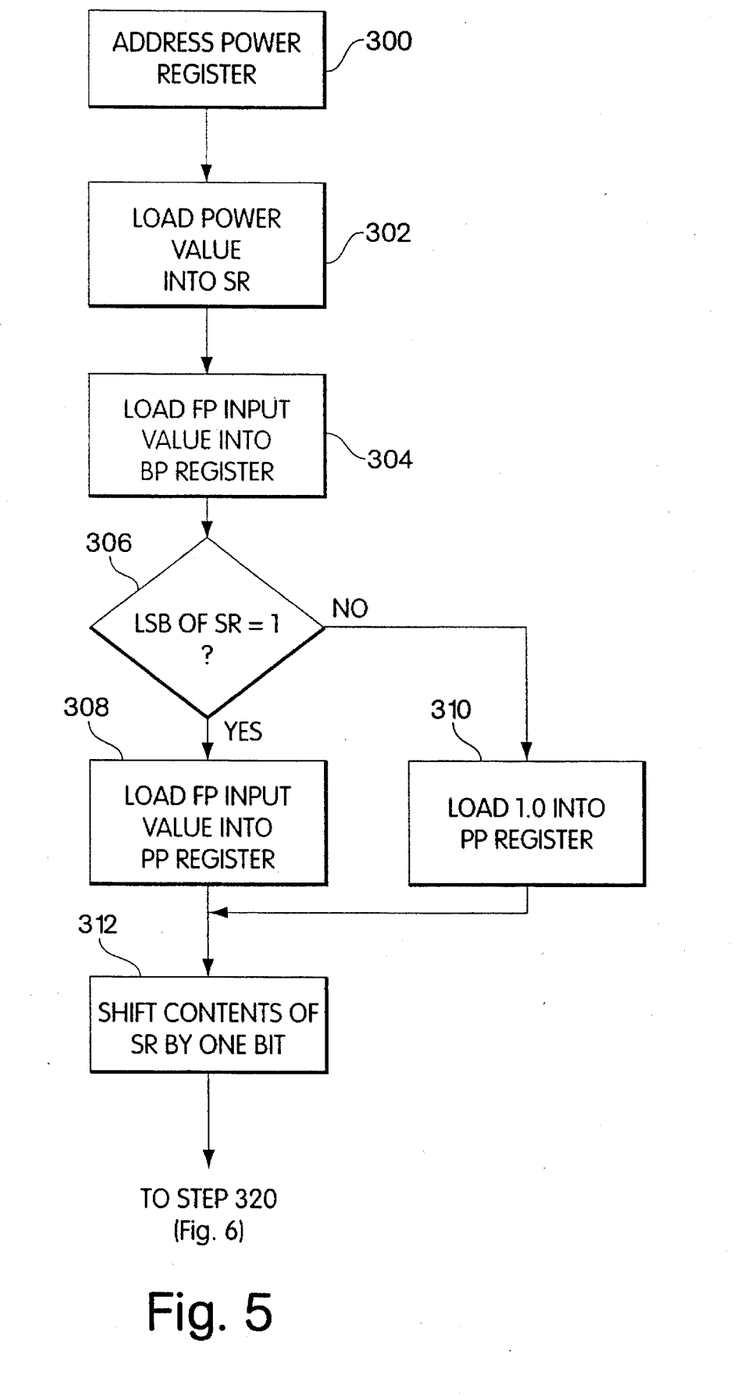
FIGS. 5 and 6 are flow diagrams of the routine executed by the hardware elements of FIG. 4 in determining an integer power of a floating point number.
Figure 8:
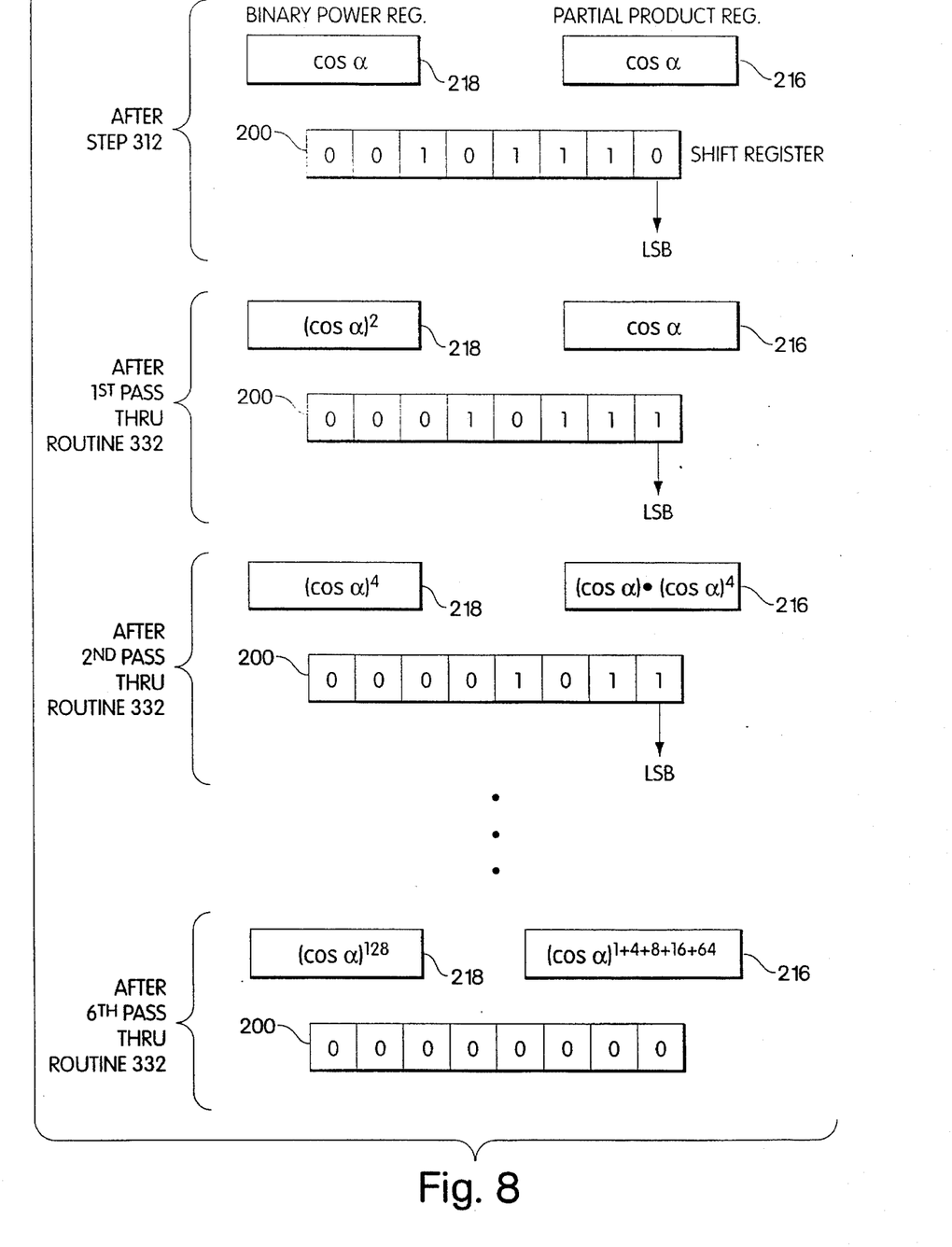
FIG. 8 illustrates an example of determining an integer power of a floating point number in accordance with the invention.

Operation of the hardware implementation of FIG. 4 in accordance with the flow diagram of FIGS. 5 and 6 is illustrated in FIG. 8. The binary power value example shown in FIG. 7 is utilized. After step 312, the floating point input value (cos α) is contained in the binary power register 218 (see step 304). The value (cos α) is also contained in the partial product register 216, because the LSB of the shift register (FIG. 7) was a 1 (step 308). In step 312, the integer power value shown in FIG. 7 is shifted one bit to the right, as shown at the top of FIG. 8. After the first pass through integer power routine 332, binary power register 218 contains the value $(\cos \alpha)^2$. The partial product register 216 contains the value cos α. The value in the partial product register 216 was unchanged, because the LSB of shift register 200 following step 312 was a 0. After the second pass through integer power routine 332, binary power register 218 contains the value $(\cos \alpha)^4$. The partial product register 216 contains the value $(\cos \alpha) \cdot (\cos \alpha)^4$. In each pass through the integer power routine 332, the current binary power value is multiplied by the accumulated partial product value in the partial product register 216, but only if the LSB of shift register 200 is a 1 (active). After the sixth pass through routine 332, the binary power register 218 contains the value $(\cos \alpha)^{128}$ and the partial product register 216 contains the value $(\cos \alpha)^{1+4+8+16+64}$. Since all bits in the shift register 200 are now 0's, no further execution of the integer power routine 332 is necessary. The contents of partial product register 216 now represent the output value, namely the integer power of the floating point value (cos α).

The disclosed hardware implementation for determining an integer power of a floating point number requires at most N-1 repetitions of the integer power routine, where N represents the number of bits in the integer power. The number of repetitions of the integer power routine is reduced for small values of the integer power, that is values where the high order bits of the integer power are 0's. It will be understood that various operations described above can be performed in parallel. For example, shifting of the contents of thee shift register can be performed in parallel with multiply operations, because different hardware elements are utilized. Furthermore, the pipelined construction of the hardware permits different multiply operations to be performed in parallel.

The circuitry shown and described herein is given by way of example only. The circuitry is preferably implemented in a large scale custom integrated circuit using logic synthesis software that is commercially available, for example, from Synopsys. The logic synthesis software optimizes and translates circuit descriptions written in high level languages, such as Verilog, into logic gates. The circuitry may be implemented using a CMOS process that produces 1 micron FET's which operate at 5 volts, a CMOS process that produces 0.6 micron drawn gate length devices which operate at 3.3 volts, or any other suitable process for implementing digital circuits.

While there have been shown and described what are at present considered the preferred embodiments of the present invention, it will be obvious to those skilled in the art that various changes and modifications may be made therein without departing from the scope of the invention as defined by the appended claims.

What is claimed is:

1. Apparatus for determining an integer power of a floating point number, comprising:

a shift register having an LSB;

a register file having a partial product register and a binary power register;

a multiplier coupled to said register file for performing floating point multiply operations; and a state machine for controlling said shift register, said register file and said multiplier, said state machine comprising:

means for loading an integer power value into said shift register and for loading a floating point input value into said binary power register;

means for loading said floating point input value into said partial product register if the LSB of said shift register is active and for loading an initial value of 1 into said partial product register if the LSB of said shift register is inactive;

means for shifting the contents of said shift register one bit toward the LSB following loading of said binary power register and said partial product register;

means for executing an integer power routine, including determining a new binary power value by causing the multiplier to multiply the contents of the binary power register by itself, determining a new partial product value by causing the multiplier to multiply the contents of the partial product register by the contents of the binary power register if the LSB of said shift register is active, determining a new partial product value equal to the contents of the partial product register if the LSB of said shift register is inactive, and shifting the contents of said shift register one bit toward the LSB following the steps of determining a new binary power value and determining a new partial product value; and means for executing said integer power routine up to N-1 times, where N is the number of bits in the integer power value, the contents of the partial product %register representing the integer power of said floating point input value after the integer power routine is executed N-1 times.

2. Apparatus as defined in claim 1 wherein said state machine further includes means for testing all bits in said shift register following each execution of said integer power routine and means responsive to a determination that all bits in said shit register are inactive for inhibiting further execution of the integer power routine.

3. Apparatus as defined in claim 1 wherein said floating point input value represents the cosine of an angle between a vector that defines the direction from which a spotlight points and a vector that defines the direction from a vertex of a graphics primitive to the position of the spotlight in a computer graphics system.

4. Apparatus as defined in claim 1 wherein said floating point input value represents the cosine of an angle between a vector that defines the reflected light ray from a vertex of a graphics primitive and a vector that defines the direction from the vertex of the graphics primitive to the position of the eye in a computer graphics system.

5. Apparatus as defined in claim 1 wherein said integer power value is represented by 14 bits.

6. Apparatus as defined in claim 1 further comprising an integer power value register coupled to said shift register and wherein said means for loading said integer power value comprises means for addressing said integer power value register.

7. Apparatus as defined in claim 1 further comprising a plurality of integer power value registers and wherein said means for loading said integer power value comprises means for addressing one of said integer power value registers.

8. A method for determining an integer power of a floating point number comprising the steps of:

a) providing a shift register having an LSB, a register file having a partial product register and a binary power register, and a multiplier coupled to said register file for performing floating point multiply operations;

b) loading an integer power value into said shift register;

c) loading a floating point input value into said binary power register;

d) loading said floating point input value into said partial product register if the LSB of said shift register is active;

e) loading an initial value of 1 into said partial product register if the LSB of said shift register is inactive;

f) shifting the contents of the shift register one bit to the right following the steps of loading the binary power register and the partial product register;

g) determining a new binary power value by multiplying the contents of the binary power register by itself;

h) determining a new partial product value by multiplying the contents of the partial product register by the contents of the binary power register if the LSB of said shift register is active;

i) determining a new partial product value equal to the contents of the partial product register if the LSB of said shift register is inactive;

j) shifting the contents of said shift register one bit to the right following steps h) and i); and k) executing steps g) through j) up to N-1 times, where N is the number of bits in the integer power value, the contents of the partial product register representing the integer power of said floating point input value after steps g) through j) are executed N-1 times.

9. A method as defined in claim 8 further including the steps of testing all bits in said shift register following each execution of steps g) through j) and inhibiting further execution of steps g) through j) in response to a determination that all bits in said shift register are inactive.

10. A method as defined in claim 8 wherein step c) includes loading the cosine of an angle between two direction vectors, said direction vectors defining the direction from which a spotlight is pointing and the direction from a vertex of a graphics primitive to the position of the spotlight.

11. A method as defined in claim 8 wherein step c) includes loading the cosine of an angle between a vector that defines the direction of reflection of light from a vertex of a graphics primitive and a vector that defines the direction from said vertex to the eye position in a computer graphics system.

12. A method as defined in claim 8 wherein step a) includes providing a plurality of integer power value registers and wherein step b) includes addressing one of said integer power value registers.

* * * * *